Aug. 27, 1929.  D. K. GANNETT  1,725,756
DETERMINATION OF DELAY BY IMPEDANCE MEASUREMENTS
Filed Nov. 19, 1927  3 Sheets-Sheet 1

INVENTOR.
D. K. Gannett
BY
ATTORNEY

Aug. 27, 1929.  D. K. GANNETT  1,725,756

DETERMINATION OF DELAY BY IMPEDANCE MEASUREMENTS

Filed Nov. 19, 1927  3 Sheets-Sheet 2

INVENTOR.
D. K. Gannett
BY
ATTORNEY

Aug. 27, 1929.  D. K. GANNETT  1,725,756
DETERMINATION OF DELAY BY IMPEDANCE MEASUREMENTS
Filed Nov. 19, 1927  3 Sheets-Sheet 3

INVENTOR.
D. K. Gannett
BY
ATTORNEY

Patented Aug. 27, 1929.

1,725,756

UNITED STATES PATENT OFFICE.

DANFORTH K. GANNETT, OF JACKSON HEIGHTS, NEW YORK, ASSIGNOR TO AMERICAN TELEPHONE AND TELEGRAPH COMPANY, A CORPORATION OF NEW YORK.

DETERMINATION OF DELAY BY IMPEDANCE MEASUREMENTS.

Application filed November 19, 1927. Serial No. 234,433.

This invention relates to determination of the delay of networks, and more particularly to methods and apparatus for determining delay by means of impedance measurements.

Heretofore, the delay of a circuit has been determined by measuring the impedance of the circuit from one end with the other end of the circuit terminated in an impedance irregularity, so that some of the current would be reflected back. The reflected current, being added to the outgoing current at the sending end, would cause the measured impedance to differ from the characteristic impedance of the circuit, that is, the impedance under such conditions that no reflection could take place. This impedance difference varied with the phase difference between the applied and reflected currents, and therefore varied with frequency in such a way as to pass through successive cycles of impedance variation. One complete impedance cycle would occur whenever the frequency was shifted from a given frequency to another frequency such that the one frequency would be shifted in phase one complete cycle as compared with the other. Since this phase shift depended upon the delay characteristic of the network, the delay could be computed in a manner described hereinafter from the frequencies at which impedance cycles were completed.

When the delay of a network is very great, however, the successive impedance cycles plotted against frequency are crowded very close together, making it difficult or impossible to interpret the curve in such a way as to properly determine the delay characteristic. In accordance with the present invention, it is proposed to overcome this difficulty by so connecting the impedance measuring circuit to the network that the current reflected back will not traverse the network twice, but will in effect traverse the network but once. This reduces the phase shift between the outgoing and return currents at the sending end one-half, and consequently the successive cycles of impedance will be twice as long as in the case of the usual method. This will permit of measuring a delay twice as great as before, assuming the same allowable minimum frequency intervals between plotted points.

The invention may now be more fully understood from the following description when read in connection with the accompanying drawing, in which Figure 1 shows an impedance bridge connected to a network whose delay characteristic is to be obtained, the network being open-circuited at the distant end; Fig. 1ª shows a similar connection with the network short-circuited at the distant end; Fig. 2 shows an impulse delay curve as determined by the ordinary method of impedance measurement; Figs. 3 and 4 are, respectively, resistance and reactance curves from which the delay curve of Fig. 2 was obtained; Fig. 17 illustrates an improved form of impedance measuring connection in accordance with the present invention; Fig. 17ª illustrates how the circuit arrangement of Fig. 17 may be derived from Fig. 14; Fig. 17ᵇ illustrates a circuit electrically equivalent to that of Fig. 17 and illustrating the principle on which Fig. 17 operates; Fig. 18ª is a circuit electrically equivalent to that of Fig. 18 and illustrating the principles upon which the latter operates; Figs. 19ª and 19ᵇ are circuits electrically equivalent to that of Fig. 19 and illustrating the operation thereof.

As already stated, it has been the practice heretofore to determine the impulse delay characteristic of the circuit of a net work by measuring the impedance from one end of the network while introducing an irregularity at the other end. The irregularity may be produced by short-circuiting the distant end of the network. After the current has been applied to the circuit until the steady state is reached the reflection adds to the outgoing current at the sending end and causes the measured impedance to differ from the characteristic impedance (condition with zero reflected current), this difference varying with the phase difference between these currents. The variations of impedances are illustrated in the impedance-frequency curves of Figs. 3 and 4, the resistance components being plotted in Fig. 3 and the reactance components in Fig. 4. The full line curves are the results obtained with the distant end of the network open-circuited, the curve in dotted lines being obtained with the distant ends short-circuited. It can readily be seen that the impedance varies cyclically over the frequency range measured.

Figures 1, 1A, 2, 3:
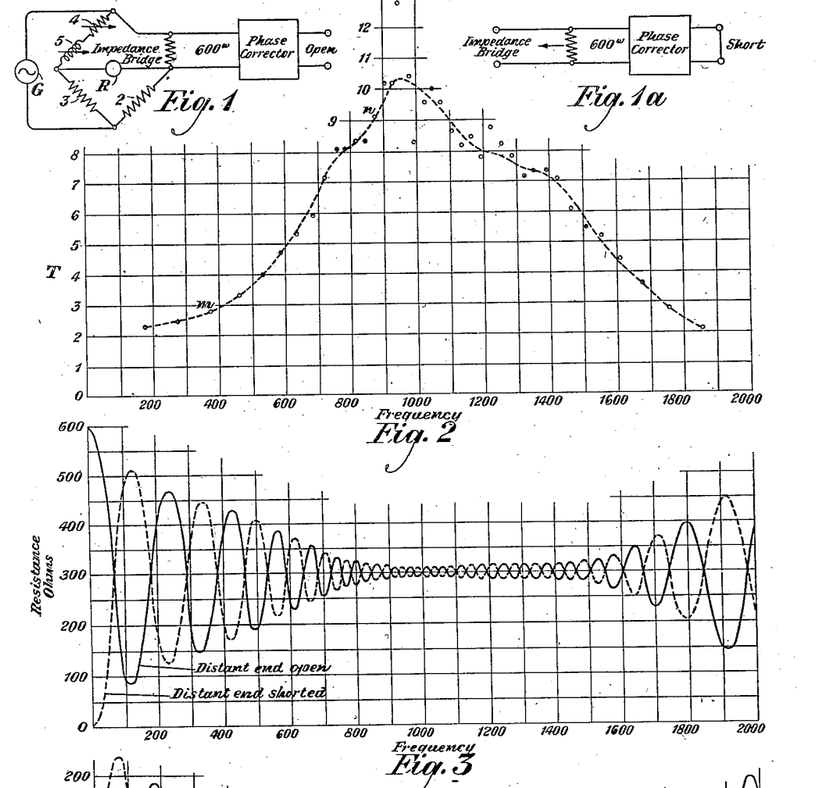

In making these impedance measurements, the usual impedance bridge is employed as illustrated symbolically in Fig. 1. The network whose impedance is to be measured constitutes one arm of the bridge, the network being shunted by an impedance (which in the case illustrated is 600 ohms). Arms 2 and 3 of the bridge may be resistance arms, while the fourth arm comprises a variable resistance 4 and a variable reactance 5. The high frequency generator G is applied to the two terminals of the bridge, while the telephone receiver R is connected across the neutral terminals, as indicated. The resistance 4 and the reactance 5 are adjusted until a balance is obtained, and the setting of these two elements indicates directly the resistance and reactance components, respectively, of the network. When the reactance is negative, the element 5 may be replaced by a variable condenser, or the variable inductance may be switched over to the arm 3 of the bridge. The impedance measurements may be made either with the distant end of the network open-circuited, as shown in Fig. 1, or short-circuited, as shown in Fig. 1ª.

Figure 4:
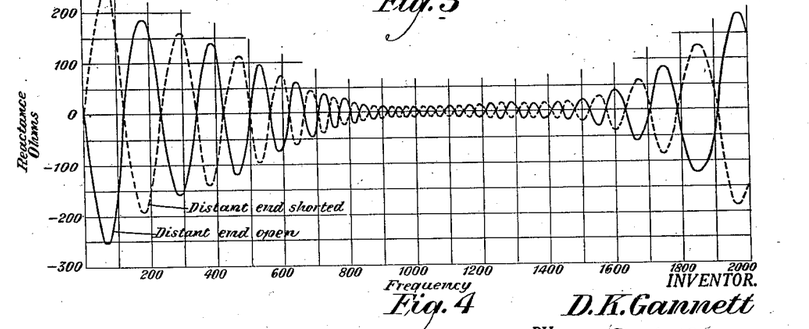

If the variation of impedance, as shown by the curves of Figs. 3 and 4, for example, completes one cycle when the frequency is changed from $f_1$ to $f_2$, it is evident that the steady state phase shift experienced by the reflected current in traveling down and back through the network is one cycle greater at $f_2$ than at $f_1$. The impulse delay T of the network at a frequency $f$ may be expressed $$T = \frac{\Delta B}{2\pi \Delta f} \quad (1)$$

where $\Delta B$ is the change in phase shift expressed in radians and produced by the network on the transmitted current while the frequency is changed by an amount $\Delta f$. Now, since in the cases illustrated in Figs. 1 and 1ª, the reflected current has passed through the network twice, the change in the steady state phase shift of the network is one-half the total phase change of 360 degrees and may therefore be expressed as $\pi$ radians for a change of frequency of $f_2-f_1$. Dividing this change of phase shift by the change of frequency (multiplied by $2\pi$) gives $$T_0 = \frac{1}{2(f_2-f_1)} \quad (2)$$

where $T_0$ is not the impulse delay at a frequency $f_1$ or at a frequency $f_2$, but at some intermediate frequency usually estimated approximately as the arithmetic means of the two.

The impulse delay of the network at any frequency is determined from the impedance curves by making measurements over a sufficient frequency range to find the length in cycles per second of an impedance cycle with its midpoint at the frequency for which the delay is to be determined. For example, a consideration of the full line curve of Fig. 3 shows that the resistance component of the impedance varies cyclically about a mean value of 300 ohms. The resistance variations shown in dotted lines and obtained with the networks short-circuited are similar in form but are 180 degrees out of phase with those obtained when the network is open-circuited and serve merely as a check upon the estimates in the form of a curve. It will be seen that one complete impedance cycle begins at approximately 286 frequency cycles and ends at about 465 cycles. Applying this to equation (2), the frequency difference is 179, which, multiplied by 2 and divided into unity, gives a trifle over 2.8 thousandths of a second as the value for $T_0$. $T_0$ may be taken as approximately the means of the frequencies 286 and 465, or 376 cycles. Plotting the delay of 2.8 thousandths of a second at this frequency in Fig. 2, we get point $m$ on the curve.

Similarly, the impedance cycle begins at the frequency of 846 cycles and ends at the frequency of approximately 901 cycles. From Formula (2), this gives 9.1 thousandths of a second at a mean frequency of 874 cycles, which is plotted at point $n$ on the curve of Fig. 2. In a similar manner, other points upon the curve may be obtained by taking other impedance cycles.

Where the delay is very great, the successive cycles of impedance plotted against frequency are crowded very close together because the greater the delay, the smaller is the frequency change necessary to make the reflected current pass through one additional cycle of phase change. This crowding together of the successive impedance cycles is illustrated by the curve of Figs. 3 and 4 in the neighborhood of 950 cycles, at which point the delay is a maximum, as indicated by the curve of Fig. 2. Since the impedance measurements are made by adjusting a generator to different frequencies by successive steps, it often becomes difficult or impossible to interpret the curve where this crowding occurs if the frequency steps to which the generator may be set are not very small. It becomes very difficult to determine the limiting frequencies of an impedance cycle and hence error enters into the computation of the points of the delay curve, as is well illustrated by Fig. 2.

Figures 5, 6, 9:
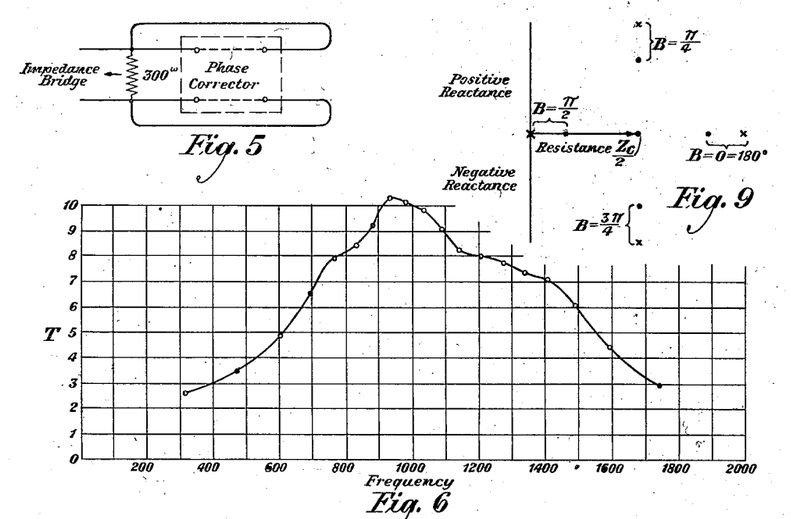
Fig. 5 is a connection showing how the impedance measuring circuit may be set up to double the length of the impedance cycles.
Fig. 6 is the impulse delay curve as determined by impedance measurements in accordance with the circuit of Fig. 5.
Fig. 9 is a fundamental circuit diagram illustrating the nature of the cyclic variation of the impedance.

In accordance with the present invention, the phase shift between the return and outgoing currents at the sending end may be reduced to one-half the amount in the case just discussed by so connecting the generator (and impedance bridge) to the network as not to allow the return of the current reflected through the networks, but to permit of conducting it directly from the distant end back to the sending end, as shown, for example, in Fig. 5. Actually, as will be shown later, this may be thought of rather as so setting up the connection that the current is transmitted into the network from each end and is then reflected back from the midpoint of the network, so that the reflected current in effect only passes through the network once. Under these circumstances, the successive cycles of impedance will be twice as long as in the previous method. This follows from the fact that when the return current has in effect traversed the network only once, a phase shift, which is one cycle greater at $f_2$ than at $f_1$, is a phase shift produced by passing, in effect, through the network once instead of twice. Since this phase shift will be one-half what it was under the conditions previously described, it will take twice as great a frequency range to complete the impedance cycle. This permits of measuring a delay twice as great as before, assuming the same allowable minimum frequency intervals between the plotted points.

Figure 7:
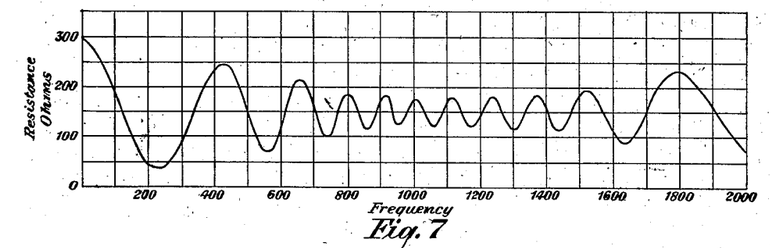
Figs. 7 and 8 are, respectively, resistance and reactance curves from which the delay curve of Fig. 6 may be obtained.
Figure 8:
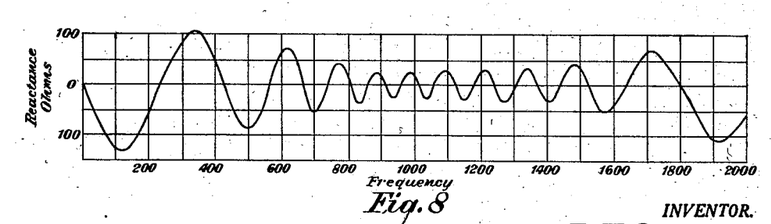

Figs. 7 and 8 illustrate, respectively, resistance and reactance curves determined under the conditions just mentioned for the same network as that measured and plotted in Figs. 3 and 4.

Figure 12:
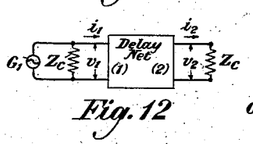
Figs. 12, 13 and 14 are fundamental diagrams to illustrate the principles upon which circuit diagrams embodying the invention may be derived.

In order that the principles underlying the invention may be more fully understood, let us consider certain hypothetical circuits, from which desired circuits in accordance with the present invention may be obtained by combination or superposition. Assume a delay network, as shown in Fig. 12, terminated at its distant end (2) in an impedance $Z_c$ equal to the characteristic impedance of the network. A generator $G_1$ is applied to the sending end (1) of the network. The generator is assumed to be of infinite impedance, (although in practice in the case of an impedance bridge, the impedance, while very large, is not really infinite) and is shunted by an impedance $Z_c$ equal to the characteristic impedance of the network, so that the impedance looking into the network will be equal to that looking back through the impedance $Z_c$ into the generator. Assume that the generator produces a voltage $v_1$ across the sending terminals of the network, and that a current $i_1$ flows along the line conductor into the network. Assume, further, that the characteristics of the network are such that a current $i_2$ flows in the line conductor leaving the network, and a potential drop $v_2$ exists across the terminating impedance $Z_c$ of the network. The arrows in the diagram (and in succeeding diagrams) indicate the direction of current flowing in the line conductor which is arbitrarily assumed to be positive. At the sending end, the voltage $v_1$ and the current $i_1$ may be expressed as follows:

$$v_1 = v_0 e^{jpt}, \quad i_1 = v_1/Z_c \quad (3)$$

In the voltage equation above, $v_0$ is a constant denoting the amplitude of the voltage, and the factor $e^{jpa}$ denotes its phase, $e$ being the base of the Naperian logarithm, $j$ being the factorial $\sqrt{-1}$, $p$ being $2\pi$ times the frequency and $t$ being the time. In the equation for the current above given, $Z_c$ may be taken as the characteristic impedance of the network.

At the receiving end (2), at which the network is terminated by the characteristic impedance of the network.

$$v_2 = v_0 e^{jpt-(A+jB)} \text{ and } i_2 = v_2/Z_c \quad (4)$$

where $A+jB$ is the propagation constant of the network, A referring to the attenuation and B to the phase shift. The voltage equation of (4) is obtained by multiplying the expression for voltage in equation (3) by the propagation factor of the network which is $e^{-(A+jB)}$. The expression for the current as given in (4) obviously follows from the fact that the current $i_2$ flowing out of the network is equal to the current flowing through the terminating impedance $Z_c$.

Figure 13:
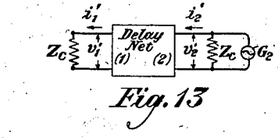

Now, let us consider the arrangement of Fig. 13, in which we have the same delay network, but with a generator $G_2$ connected across the terminating impedance $Z_c$ at the right-hand end of the network, the generator $G_1$ being removed from the left-hand end. Assume that the generator $G_2$ is such as to produce a current $i_2'$ which is equal and opposite to the current $i_2$ in Fig. 12. The current through $Z_c$ at the right in Fig. 13 will then flow in the same direction as the corresponding current through the terminating impedance $Z_c$ at the right in Fig. 12. It will also be equal thereto, and since the impedance of the network is $Z_c$, the current $i_2'$ flowing into the network in Fig. 12 is numerically equal to the current through the terminating impedance $Z_c$ at the right in Fig. 13. Also, the drop $v_2'$, due to the current through $Z_c$ at the right in Fig. 13, will be equal to the corresponding drop $v_2$ in Fig. 12 and in the same direction. Hence, $$v_2' = v_0 e^{jpt-(A+jB)}, \quad i_2' = +v_2'/Z_c \quad (5)$$

At the left-hand end of Fig. 2, we have $$v_1' = v_0 e^{jpt-2(A+jB)}, \quad i_1' = +v_1'/Z_c \quad (6)$$

The expression for the voltage as given in (6) is obtained by multiplying the voltage given by Equation (5) by the propagation factor $e^{-(A+jB)}$. The arrows in Fig. 13 indicate that the direction of current which is assumed to be positive, is the opposite to that of Fig. 12. This is done in order to facilitate an understanding of what takes place when the arrangements of Figs. 12 and 13 are superposed.

Figure 14:
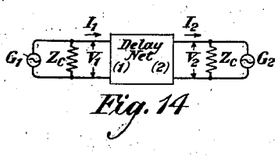

Fig. 14 illustrates how the arangements of currents and voltages, as described in connection with Figs. 12 and 13, may be superposed to give the voltage $v_1$ across the input terminals (1) of the network, a current $I_1$ flowing into the network, a current $I_2$ leaving the network and a voltage drop $V_2$ across the output terminals (2) of the network. By superimposing the currents and voltages of Figs. 12 and 13, we then have $$\begin{aligned} V_1 &= v_1 + v_1' & I_1 &= i_1 - i_1' \\ V_2 &= v_2 + v_2' & I_2 &= i_2 - i_2' = 0 \end{aligned} \quad (7)$$

The negative sign before $i_1'$ and $i_2'$ in the equations for the currents indicate the fact that these particular currents will flow in the opposite direction to the currents $i_1$ and $i_2$, respectively.

It will be noted that since $I_2=0$, this case corresponds to the arrangement shown in Fig. 4, where the receiving end of the network is open-circuited, and an alternating current from a source G is applied across an impedance $Z_c$ at the sending end of the network. In other words, the superposition indicated by Fig. 14, with the currents and voltages as given by the above equations, is equivalent to an arrangement for measuring the impedance of the network with the distant end open-circuited.

The impedances at the sending end (1) and receiving end (2) of Fig. 14, in each case looking toward the right in the diagram, are $$Z_1 = V_1/I_1 \quad (8)$$

and $$Z_2 = V_2/I_2 = \infty \quad (9)$$

The impedance viewed from the generator G, still looking toward the right, will be $$Z = \frac{V_1}{I_1 + (V_1/Z_c)} = Z_c \frac{V_1}{i_1 Z_c - i_1' Z_c + V_1} \quad (10)$$

Substituting values of $V_1$ and $I_1$ from Equations (7), (3) and (6) in Equation (10), and then simplifying, we have $$Z = Z_c \frac{v_0 e^{jpt} + v_0 e^{jpt-2(A+jB)}}{v_0 e^{jpt} - v_0 e^{jpt-2(A+jB)} + v_0 e^{jpt} + v_0 e^{jpt-2(A+jB)}}$$

$$= \frac{Z_c}{2}[1 + e^{-2(A+jB)}] \quad (11)$$

$$= \frac{Z_c}{2}(1 + e^{-2A}\cos 2B) - j\frac{Z_c}{2}e^{-2A}\sin 2B.$$

A study of Equation (11) shows that if Z be considered as a function of frequency, B, the phase change, increases with frequency, and the value of Z will oscillate about $\frac{Z_c}{2}$, completing a cycle of variation as $\triangle B = \pi$. In order to understand more fully what is meant by the above statement, let us consider the vector diagram shown in Fig. 9. In this diagram, resistance values are plotted as abscissæ, and reactance values are plotted as ordinates. Let us assume that $\frac{Z_c}{2}$ is a pure resistance. This value may then be plotted as the horizontal vector indicated in the diagram. If B=0, the cosine of 2B will be equal to 1, and the sine of 2B will equal zero. Now, in Equation (11) the factor $e^{-2A}$ will be maximum when the attentuation A is zero, under which condition this factor becomes unity. If, however, there is an appreciable attenuation, this factor will have a value somewhat less than unity. Assuming this to be the case, then when B=0, the first term of Equation (11) will have a value somewhere between $\frac{Z_c}{2}$ and $Z_c$; while the second term will be equal to zero. The resultant value of Z is then somewhere between $\frac{Z}{2}$ and $Z_c$, as indicated by the dot marked B=0, in the vector diagram.

Suppose, now B=45°, or $\frac{\pi}{4}$, then cos 2B=0 and sin 2B=1. The first term of Equation (11) is then equal to $\frac{Z_c}{2}$, and the second term (due to attenuation) will have a value of less than $j\frac{Z_c}{2}$. Plotting the first term to the right along the base line as abscissa, and the second term upwardly, the value of Z will be as indicated by the dot marked $B=\frac{\pi}{4}$ in Fig. 9.

Similarly, if $B=90°$ or $\frac{\pi}{2}$, then $\cos 2B = -1$, and $\sin 2B = 0$. The first term of Equation (1) will then have a value between 0 and $\frac{Z_c}{2}$; while the second term will be 0. The resultant value of Z may then be plotted as indicated by the dot marked $B=\frac{\pi}{2}$ in Fig. 9.

So, also, if $B=135°$, or $\frac{3\pi}{4}$, then $\cos 2B = 0$ and $\sin 2B = -1$. The first term of Equation (11) will then be equal to $\frac{Z_c}{2}$, and the second term will be somewhat less numerically than $-j\frac{Z_c}{2}$. The resultant value of Z may be plotted as indicated by the dot marked $B=\frac{3\pi}{4}$. Thus, it will be seen that as B varies, the value of Z will oscillate about $\frac{Z_c}{2}$.

If there is no attenuation, so that $A=0$, then the factor $e^{-2A}$ will be equal to 1, and the values of Z for the four cases above given will be as indicated by the points marked $x$ in the vector diagram. In each case, the value of Z will lie on a radius $\frac{Z_c}{2}$ swung about the point marked $\frac{Z_c}{2}$ in the diagram. Consequently, if the network has a constant impulse delay, that is, if B is proportional to frequency (see Equation 1) and there is no attenuation over the frequency range, then the impedance curves are pure sine curves. The resistance and reactance curves will have the same amplitude and will be in quadrature with each other.

This is clearly shown by the diagrams in Figs. 3 and 4. For example, in Fig. 3 the resistance varies from zero to 600 ohms, about a mean value of 300 ohms, and the reactance in Fig. 4 varies from $-300$ to $+300$ ohms (the characteristic impedance being a pure resistance of 600 ohms). The particular network, whose impedance characteristics are indicated in Figs. 3 and 4, is of the general type illustrated in Fig. 10. For this network, the attenuation varies with frequency and is a maximum, approximately, at the frequency for which the delay is a maximum. This causes a change, with frequency, of the amplitude of the impedance variations, so that the impedance variation is less in the range where the delay is a maximum, as shown by the curve of Figs. 2, 3 and 4. Due to the variation of impulse delay with frequency, the length of an impedance cycle (in cycles per second of frequency) also varies with frequency. The effect of this varying delay on the impedance curves is that they are crowded together along the axis in the region of the frequency of maximum delay, as is clearly indicated in Figs. 3 and 4.

Figure 10:
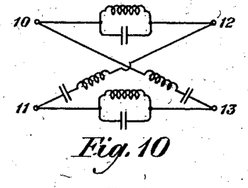
Figs. 10 and 11 illustrate, respectively, two forms of network sections which may be employed in delay circuits.

For the network illustrated in Fig. 10, the total change in B, in going from zero to infinite frequency, is $2\pi$ radians. In order to understand this more clearly, let us assume that a direct current or a current at zero frequency is flowing. This current will pass from 10 to 12 in Fig. 10 through the series inductance, and, after passing through other sections, will come back to 12 and pass through the series inductance in the lower line to 11. Obviously, there will be no phase change in the current at 12—13 as compared with 10—11 because none of the current is shunted across the line. At resonance no current will flow in series with the line because of the anti-resonant circuits. Therefore, the wave, in being transmitted from points 10—11 to points 12—13, will pass from 10 to 13 and from 11 to 12, thus being changed in phase by 180 degrees. At infinite frequency, the current will be prevented from passing through the shunt or lattice conductors because of the inductances included in series therein. The current will therefore pass freely from points 10—11 to points 12—13 through the capacities of the anti-resonant tuned circuits, and will therefore arrive at the points 12—13 without phase change. Obviously, therefore, the current has undergone one cycle of phase change in passing from zero to infinite frequency. It follows from this that the number of complete impedance cycles in this entire frequency range is twice the number of sections. This last statement will be clear when it is remembered that in connection with the explanation of the vector diagram of Fig. 9, the impedance Z underwent a complete cycle, while the value of B went through one-half cycle (0 to 180°). As it has just been shown that B goes through one cycle for each section, B will obviously go through the same number of cycles as there are sections, and hence the impedance will go through twice the number of cycles that there are sections of the network.

It will be noted that in the foregoing it has been assumed that there was not a second reflection of the wave upon returning to the sending end of the network. If there were such a reflection, the Z curve would be more or less distorted from that determined above.

Figure 15:
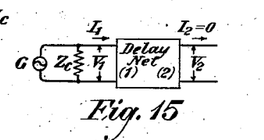
Figs. 15 and 16 show symbolically circuits for measuring the impedance of networks with the distant ends open-circuited and short-circuited.

The arrangement shown in Fig. 15, which has just been derived and discussed, represents the usual method of determining the delay of a network or line by impedance measurements. The method is sometimes varied, however, as already stated, by short-circuiting the distant end of the network. In order to understand the effect of this, let us consider a superposition such as that of Fig. 14, in which each voltage is the difference between the corresponding voltage in Figs. 12 and 13, and each current is the difference between the corresponding currents of Figs. 12 and 13. Then $$V_1 = v_1 - v_1' \qquad I_1 = i_1 + i_1'$$
$$V_2 = v_2 - v_2' = 0 \qquad I_2 = i_2 + i_2' \qquad (12)$$

Figure 16:
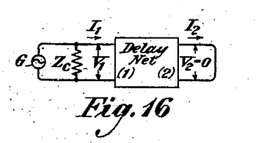

The plus sign of $i_1'$ and $i_2'$ in the preceding current equations is due to the fact that the currents in Fig. 13 are in the opposite direction to those of Fig. 12, and consequently when subtracted algebraically, the currents in the two figures add to each other numerically. It will be noted, also, from Equation (12) that the voltage $V_2$ is equal to zero, which corresponds to the condition of Fig. 16 where the receiving or distant end of the network is short-circuited. The impedance Z, looking to the right from the generator, may be obtained from Equation (12) by an operation similar to that described in connection with the derivation of Equation (11), as follows:

$$Z = \frac{Z_c}{2}(1 - e^{-2A}\cos 2B) + j\frac{Z_c}{2}e^{-2A}\sin 2B \qquad (13)$$

A comparison of Equation (13) with Equation (11) shows that this case differs from the case of Fig. 15 in that the variation of the impedance Z from $\frac{Z_c}{2}$ is exactly the negative of what it was in the previous case.

In both of these cases, the reflected current, which produces the variation in impedances, in effect passes through the network twice. Let us now derive a circuit in which the reflected current in effect only passes through the network once. Consider Fig. 13 again, but this time with the currents and voltages having the values $$v_2' = v_0 e^{jpt} \qquad i_2' = +v_2'/Z_c$$
$$v_1' = v_0 e^{jpt - (A+jB)} \qquad i_1' = +v_1'/Z_c \qquad (14)$$

Superimposing this upon Fig. 12, by adding voltages and currents, the result in Fig. 14 will be $$V_1 = v_1 + v_1' \qquad I_1 = i_1 - i_1'$$
$$V_2 = v_2 + v_2' = V_1 \qquad I_2 = i_2 - i_2' = -I_1' \qquad (15)$$

The minus sign of $I_1$ in the last equation is due to the fact that $I_2$ flows in the opposite direction to $I_1$. In this connection, note that the arrows in Fig. 14 merely denote the direction of current, which is assumed to be positive, and not the relative direction of current flow. Since it is possible to connect together the points of equal potential without destroying the distribution of currents and voltages, the superposition just described for Fig. 14 will be equivalent to the circuit arrangements shown in Fig. 17$^a$. Here, again, it must be remembered that the arrows indicate the direction of current flow which is assumed to be positive and not the relative direction of the currents $I_1$ and $I_2$. By combining the two impedances $Z_c$ in parallel as a single impedance having the value $\frac{Z_c}{2}$, the arrangement of Fig. 17$^a$ becomes that illustrated in Fig. 17.

The total current flowing through the conductor $a$ in Fig. 17 will be $$I = I_1 - I_2 = 2I_1 \qquad (16)$$

the negative sign occurring because the convention with regard to the direction of the positive current at the sending end (1) and receiving end (2) of the network is the same although the currents will actually flow in opposing directions. The impedance of the combination viewed from the generator is now $$Z = \frac{V_1}{2I_1 + (2V_1/Z_c)}$$
$$= \frac{Z_c}{4}(1 + e^{-A}\cos B) - j\frac{Z_c}{2}e^{-A}\sin B \qquad (17)$$

In this case, Z as a function of frequency against oscillates, this time about $\frac{Z_c}{4}$, the impedance cycles being twice as long as previously. In other words, in a vector diagram similar to that of Fig. 9, the value of Z would move about a point $\frac{Z_c}{4}$ as the value of B passes from zero to 360 degrees instead of from zero to 180 degrees, as in the previous case. The delay will be determined in the same general way as before, the formula for the delay, however, now being $$T_0 = 1/(f_2 - f_1) \qquad (18)$$

It will now be possible to measure a delay twice as great as before, assuming the same minimum allowable frequency intervals between plotted points. Impedance curves plotted in accordance with this method of measurement are illustrated in Figs. 7 and 8. As the cyclic variation of these curves is spread over a greater frequency area, it is much easier to interpret and plot the impedance measurements in the form of curves than in accordance with the method previously described.

The delay curve of Fig. 6 may be obtained from the curves of Figs. 7 and 8 in a manner similar to that described in connection with Figs. 3 and 4, except that Formula (18) will be used instead of Formula (2). For example, in Fig. 8 the resistance undergoes a complete cycle in passing from a frequency of about 830 cycles to about 938 cycles. The difference in frequency is now 108, which, divided into unity, gives a delay time $T_0$ of 9.26 thousandths of a second at a mean frequency of 884 cycles.

In understanding how the circuit arrangement of Fig. 17 functions to permit the reflected current to flow, in effect, only through a number of sections equivalent to the total number of sections of the network, it may be of interest to show that the circuit arrangement of Fig. 17 is equivalent to the circuit arrangement shown in Fig. 17$^b$, where each of the two networks shown has a propagation constant equal to one-half that of the original network, the characteristic impedance remaining $Z_c$, as before. In order to show this, let us consider the current through the series member of the network of Fig. 17 at the midpoint thereof. This is obtained by adding the currents at this point in Figs. 12 and 13. Let $v_3$ be the voltage across the line at the midpoint of the network in Fig. 12, and let $i_3$ be the current in the line at that point. Likewise, let $v_3'$ and $i_3'$ be the corresponding voltages and currents in Fig. 13. By analogy to Equation (4) we have $$v_3 = v_0 e^{jpt-(1/2)(A+jB)} \text{ and } i_3 = v_3/Z_c \quad (19)$$

So, also, by analogy to Equations (14)

$$v_3' = v_0 e^{jpt-(1/2)(A+jB)} \text{ and } i_3' = +v_3'/Z_c \quad (20)$$

Therefore, when superimposed in Fig. 14, we have $$I_3 = i_3 - i_3' = \frac{v_0}{Z_c} e^{jpt-(1/2)(A+jB)} - \frac{v_0}{Z_c} e^{jpt-(1/2)(A+jB)} = 0 \quad (21)$$

Since the conductors through which the current is zero may be cut without altering the distribution of currents and voltages, the circuit of Fig. 17$^b$ is obviously equivalent to the circuit of Fig. 17$^a$. Hence, the operation of the circuit of Fig. 17 may be thought of as one in which the current from the generator is transmitted to both ends of the network, from thence to the midpoint of the network (where the network is in effect open-circuited) and thence reflected back over each half of the network.

Let us now derive a circuit in which the action will be equivalent to applying current from the generator to both ends of a network which is short-circuited at its midpoint. Consider the case of superposition in Fig. 14 similar to that described in deriving Fig. 17$^a$, but where the resultant voltage is the difference between the corresponding voltages in Figs. 12 and 13 and each current is the difference between the corresponding currents in Figs. 12 and 13. Subtracting the values of currents and voltages as given by Equations (14) for the new distribution in Fig. 13 from the currents and voltages in Fig. 12, as given by Equations (3) and (4), we have $$V_1 = v_1 - v_1' \qquad I_1 = i_1 + i_1'$$
$$V_2 = v_2 - v_2' = -V_1 \quad I_2 = i_2 + i_2' = I_1 \quad (22)$$

Figure 18:
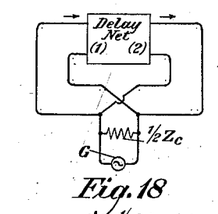
Fig. 18 is a modified form of impedance measuring circuit closely related to that of Fig. 17.

The points of equal potential, which may now be connected together, will depend upon the character of the network. If the network is of the general type shown in Fig. 10, so that the two line conductors are balanced with respect to each other, then the potential at any point in one series member is exactly the negative of that at the corresponding point in the other series member. Each sending terminal will have the same potential as the receiving terminal corresponding to the opposite series member. They may then be connected together, giving the circuit shown in Fig. 18. The impedance of the circuit, when viewed from the generator, may be computed as indicated in the cases above and is found to be $$Z = \frac{Z_c}{4}(1 - e^{-A} \cos B) + j\frac{Z_c}{4} e^{-A} \sin B \quad (23)$$

The delay may be measured by the same formula as that used in connection with the arrangement of Fig. 17.

Figure 18A:
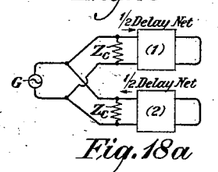

The connection may be shown in the same general way as was done for Fig. 17, to be equivalent to Fig. 18$^a$. Thus the voltage $V_3$ at the midpoint may be expressed $$V_3 = v_3 - v_3' \quad (24)$$

Substituting from Equations (19) and (20) we get $$V_3 = v_0 e^{jpt-(1/2)(A+jB)} - v_0 e^{jpt-(1/2)(A+jB)} = 0 \quad (25)$$

This condition means that at the midpoint of the network both sides of the line are at the same potential so that a short-circuit across the line at that point will not affect the distribution of potentials and currents.

Figure 11:
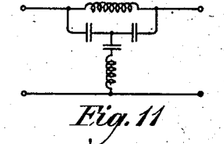

This will not hold, of course, if an unbalanced network composed of sections of the general type shown in Fig. 11 should be employed. So far as its general electrical characteristics are concerned, such, for example, as attenuation, delay, propagation factor, etc., the network of Fig. 11 is electrically equivalent to that of Fig. 10. It does differ from the arrangement of Fig. 10, however, in one important respect, namely, that all the series elements are segregated in one side of the line so that the network made up of a number of sections of the type of Fig. 11 will have a lower line conductor which is purely a strap for connecting the various sections together. This lower conductor or strap will be at the same potential throughout its length. In this case, the terminals of the upper line member are at potentials which are the negative of each other. The connection shown in Fig. 19$^a$ is then possible without altering the distribution of currents and voltages, except that now the voltage of the generator must be twice as great as previously. This will be clear from the fact that the arrangement of Fig. 19ᵃ is derived from that of Fig. 14 (assuming that the lower conductor of Fig. 14 is purely a strap) by joining the lower terminals of the terminal impedances $Z_c$ of Fig. 14 together, without joining the upper terminals of said impedances. This will give the circuit of Fig. 19ᵃ in which there will be two separate generators, one bridged across each of the impedances $Z_c$ of Fig. 19ᵃ. Obviously, these two generators may be replaced by a single generator having twice the voltage. Since $I_1 = I_2$, no current will flow through the conductor $b$ between the strap member of the network (shown by a solid line through the network, the other series member being shown by a dotted line) and the midpoint of the impedances $Z_c$. This conductor $b$ may then be removed, giving the equivalent connection shown in Fig. 19.

Figure 19:
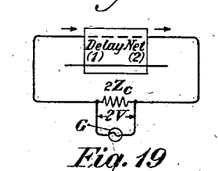
Fig. 19 illustrates still another modified form of circuit for impedance measurement.
Figure 19A:
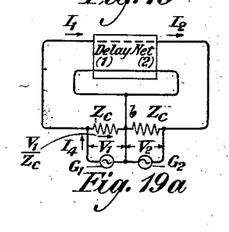

The expression for the impedance of Fig. 19, looking from the generator, may be obtained as follows:

Returning to the equivalent circuit of Fig. 19ᵃ, it is evident that the opposite terminals of the upper conductor of the network are at a voltage difference of $2V_1$. This is also evident from Equation (22) where $V_2 = V_1$. Subtracting voltages as described in connection with Fig. 18, we have $$V_1 - V_2 = V_1 - (-V_1) = 2V_1 \quad (26)$$

Considering, for the moment, the two generators of Fig. 19ᵃ replaced by a single generator having twice the voltage, the impedance $Z$, looking from the generator, may be expressed $$Z = \frac{2V_1}{I_4} \quad (27)$$

where $I_4$ is the current flowing from one terminal of the generator to the junction of the shunting impedance $Z_c$ and the upper conductor of the input side of the network. This current, however, is equal to the sum of the current $I_1$ flowing into the network and the current flowing through the terminating impedance. Hence.

$$I_4 = I_1 + \frac{V_1}{Z_c} \quad (28)$$

Combining (27) and (28) we have $$Z = \frac{2V_1}{I_1 + (V_1/Z_c)} = Z_c(1 - e^{-A}\cos B) + jZ_c e^{-A} \sin B \quad (29)$$

Figure 19B:
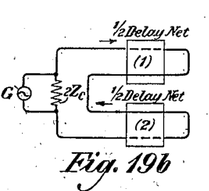

The delay must be measured as described for circuits (17) and (18). The connection may also be shown in the same general way, as, in the case of Fig. 18, to be equivalent to the circuit shown in Fig. 19ᵇ, as Equations (24) and (25) hold for this case as well as for the case of Fig. 18.

Figure 20:
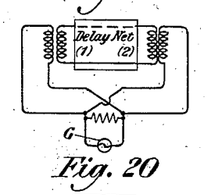
Figs. 20 and 21 illustrate impedance measuring circuits similar to the types illustrated in other figures, but modified to employ transformers.
Figure 21:
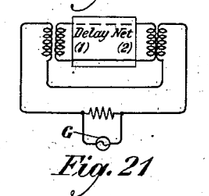
Figure 22:
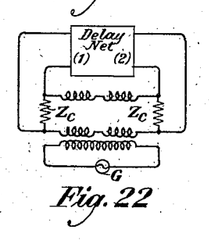
Fig. 22 illustrates a still further modified form of the invention employing a hybrid coil connection.

It is, of course, obvious from the above that transformers may be used for connecting the sending to the receiving ends in cases where the potentials at the ends do not match. For example, Fig. 20 shows transformers applied to a circuit of the type of Fig. 18, and Fig. 22 similarly shows transformers applied to a circuit of the type of Fig. 19 or Fig. 19ᵃ. So, also, Fig. 22 may be derived from Fig. 17ᵃ by introducing a hybrid coil type of transformer between the generator and the terminals of the terminating impedances $Z_c$.

It will be obvious that the general principles herein disclosed may be embodied in many other organizations widely different from those illustrated, without departing from the spirit of the invention as defined in the following claims. It will also be clear that in the claims where language is used implying that currents applied from a generator to the opposite ends of a network flow into the network and are reflected back from the middle thereof, such language is not to be understood as implying that such is the necessary and essential action of the circuit. On the contrary, such language is merely intended to express any proper point of view which may be held as to the action of the circuits herein described as embodying the present invention. For example, the language is to be understood as covering the point of view that the current leaving the generator flows through the delay network in one direction and is absorbed by the connections to the generator at the other end without reflection, current at the same time flowing through the network from the generator in the opposite direction and being absorbed without reflection at the first end of the network.

What is claimed is:

1. The method of ascertaining the delay characteristic of a network, which consists in transmitting alternating current into the network from each direction simultaneously so that reflected current in effect passes through a number of sections equivalent to the total number of sections of the network once only, thereby producing cyclic impedance variations as the frequency is changed, and measuring the impedance for each of a plurality of frequencies under steady state conditions.

2. The method of ascertaining the delay characteristic of a network, which consists in transmitting alternating current into the network from each direction simultaneously so that reflected current in effect passes through a number of sections equivalent to the total number of sections of the network once only, thereby producing cyclic impedance variations as the frequency is changed, measuring the impedance for each of a plurality of frequencies under steady state conditions, ascertaining from the impedance measurements the frequencies for corresponding points in successive cycles of impedance variation, and determining the delay at a frequency intermediate between two such frequencies, from the known relation between the phase change with frequency corresponding to a cycle of impedance variation, and the frequency change corresponding to the impedance cycle.

3. The method of ascertaining the delay characteristic of a network, which consists in transmitting alternating current from a generator into both ends of the network simultaneously, reflecting the current back from the midpoint toward each end of the network, thereby producing at the ends of the network cyclic impedance variations as the frequency is changed, and measuring the impedance for each of a plurality of frequencies under steady state conditions.

4. The method of ascertaining the delay characteristic of a network, which consists in transmitting alternating current from a generator into both ends of the network simultaneously, reflecting the current back from the midpoint toward each end of the network, thereby producing at the ends of the network cyclic impedance variations as the frequency is changed, measuring the impedance for each of a plurality of frequencies under steady state conditions, ascertaining from the impedance measurements the frequencies for corresponding points in successive cycles of impedance variation, and determining the delay at a frequency intermediate between two such frequencies, from the known relation between the phase change with frequency corresponding to a cycle of impedance variation, and the frequency change corresponding to the impedance cycle.

5. A circuit arrangement for determining variation of impedance of a network with frequency, comprising an impedance bridge including a variable frequency current source, connections from said source to one end of the network, connections from the other end of said network back to said source, said connections being so balanced with respect to the network and generators that current entering either end of the network will in effect arrive back at the point from which it was originally transmitted after traversing but once a number of sections of network not exceeding the total number comprising the network, and means to measure the resulting impedance at the bridge for each of a plurality of frequencies.

6. A circuit arrangement for determining variations of impedance of a network with frequency, comprising an impedance bridge including a variable frequency current source, connections from said source to both ends of said network, said connections being so balanced with respect to said network and said generator that current entering either end of the network will in effect be reflected back from the midpoint of the network to the point from which it was originally transmitted, and means to measure at the bridge the impedance variation with frequency resulting from the combining of the transmitted waves with the reflected waves.

In testimony whereof, I have signed my name to this specification this 18th day of November, 1927.

DANFORTH K. GANNETT.